United States Patent [19]

Schmidt

[11] 4,290,095

[45] Sep. 15, 1981

[54] AIMING POST LIGHT

[76] Inventor: Robert C. H. Schmidt, 2631 Stafford Blvd., Bettendorf, Iowa 52722

[21] Appl. No.: 69,954

[22] Filed: Aug. 27, 1979

[51] Int. Cl.[3] .......... H04M 1/22

[52] U.S. Cl. .......... 362/191; 362/800; 362/202

[58] Field of Search .......... 362/191, 800

[56] References Cited

U.S. PATENT DOCUMENTS

| | | | |
|---|---|---|---|
| 3,340,390 | 9/1967 | Imre | 362/191 |
| 3,867,764 | 2/1975 | Dunmire et al. | 362/800 |

*Primary Examiner*—Stephen J. Lechert, Jr.

*Attorney, Agent, or Firm*—Nathan Edelberg; Robert P. Gibson; Robert O. Richardson

[57] ABSTRACT

An aiming post light for artillery and mortar operations at night wherein an ordinary GI flashlight may be used, without modification, as a post light when mounted on a support and wherein its original ordinary lightbulb is replaced with a novel bulb of same base outer configuration in which the bulb has encapsulated solid state circuitry to provide a blinking and/or steady light emitting diode (LED) as the light source. Depending upon the particular LED and circuitry selected, the light may be continuous or intermittent and may be a selected color. In one embodiment several options are available when using a single bulb.

5 Claims, 6 Drawing Figures

AIMING POST LIGHT

GOVERNMENT RIGHTS

The invention described herein may be manufactured and/or used by or for the Government for governmental purposes without the payment of any royalty thereon.

RELATED INVENTIONS

This invention is an improvement over patent application Ser. No. 10,551 filed Feb. 9, 1979 by Carl Hubbard et al for Blinker Aiming Post Light.

BACKGROUND OF THE INVENTION

Since WWII the M14 Aiming Post Light has been used for artillery and mortar operations to maintain orientation despite possible movement of the gun when fired. Each light consisted of two size D flashlight batteries in a brass case having an on-off switch, an incandescent bulb and a reflector/lens filter. To avoid confusion, half the lights have a red filter and half have a green filter. Each howitzer or mortar uses one of each. They presently cost over $25 each.

Aiming post lights are placed forward of their guns a distance from 50 to 100 meters. They drain the batteries in a night or so and require replacement, sometimes a hazardous task, particularly when the enemy is close by. Obviously an aiming light that will survive an engagement without replacing batteries is preferred.

The aiming post light in the Hubbard et al application consisted of a flashlight with a LED and integrated circuitry that had to be attached to the flashlight contacts with clips, which was unacceptable from a ruggedness viewpoint, or soldered to the contacts, which made it nonreversible back to flashlight use again. FIG. 3 of Hubbard et al overcomes this with a bulb having a capacitor 52 as the base and an integrated circuit 56 on the bottom. This posed fabrication problems.

SUMMARY OF THE PRESENT INVENTION

In accordance with the present invention, an aiming post light has been developed that has a very prolonged use life compared to those heretofore used. Advantage is taken of solid state circuitry, including solid state light sources, which will provide an appropriate light intensity and switching frequency to obtain most efficient use of dry cell energy while obtaining optimum human perception of the light.

In a preferred embodiment, a GI flashlight is fitted with a stake engaging clamp. The head of the flashlight has a pair of contacts which contact the bottom of the regular flashlight bulb and the side of the reflector into which the bulb is positioned. These contacts place the bulb into the circuit with the batteries and on-off switch for its operation. In the present invention, the solid state circuit, including the light emitting diode, is formed into a flashlight bulb configuration and is positioned in the reflector to replace the original flashlight bulb. The regular flashlight on-off switch is thus in circuit and is used to initiate the blinking action of the diode. The diodes may emit red or green light and the blinking frequencies of each color may vary to assist color blind operators to distinguish between the two colors.

Not only does the blinker aiming post light of the present invention achieve its major goal of extremely long use life, in the order of months instead of hours, but it is also far less expensive than those heretofore used. For example, the flashlight costs about $2.13 and the noval bulb less than $1. Flashlights and batteries are already fielded items, plentiful in supply and easy to obtain. Only the mounting bracket and light bulb need be added.

The present invention is an improvement over the copending Hubbard et al invention previously referred to in that the novel light bulb is in various forms of fabrication and certain embodiments provide for several modes of operation, i.e., continuous or blinking light and selected colors from the same bulb. Additionally, a mounting bracket has been designed for use with the flashlight belt clip so that no modification of the flashlight is necessary.

DETAILED DESCRIPTION OF ILLUSTRATIVE EMBODIMENTS

Figure 1:
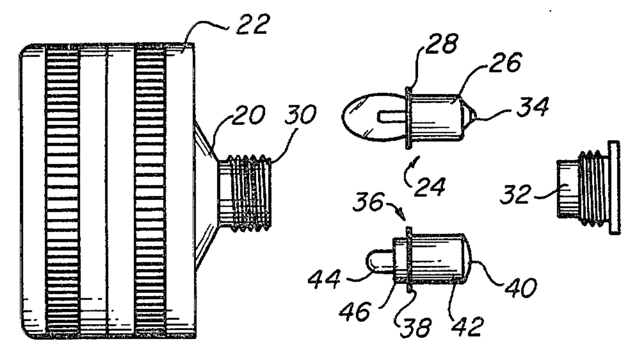
FIG. 1 is a perspective view of an ordinary GI flashlight with bulb holder removed, and showing an ordinary flashlight bulb and a bulb made in accordance with the present invention.
Figure 1:
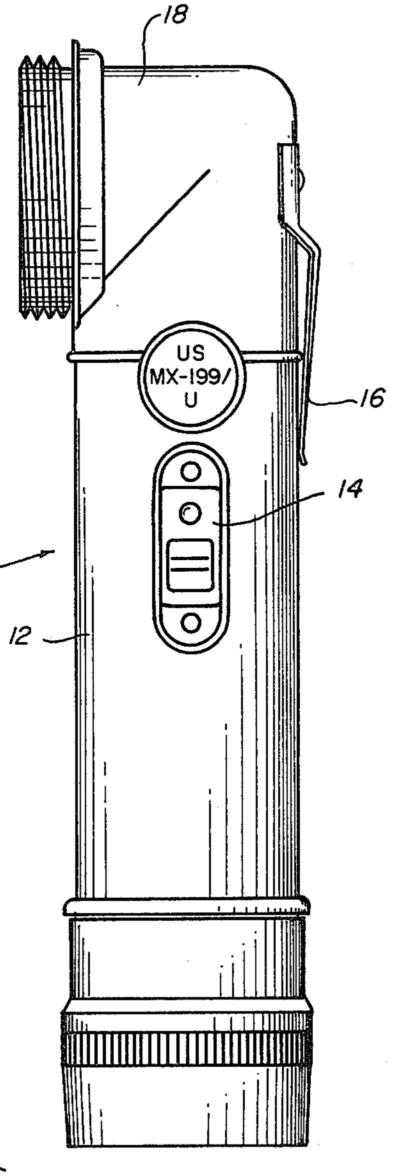

Reference is now made to FIG. 1 wherein there is shown a conventional GI flashlight 10 having a body portion 12 containing a pair of size D 1.5 volt dry cell batteries, not shown. On the side is a switch 14 and on the back is a belt clip 16. The head 18 of the body portion extends normal to the axis of the body portion to enable a beam of light to be directed horizontally when the body portion is in upright position. A reflector 20 and lens, not shown, is positioned within a lens holder 22. A conventional light bulb 24 has a metallic base 26 and collar 28 that fits into the center threaded opening 30 of the reflector and is held in place with a plastic bulb holder 32. When assembled, the metallic base 26, collar 28 and reflector 20 makes electrical contact with a negative lead, not shown, on the inner side of head 18. The center contact 34 of the bulb contacts a positive lead, not shown, in the center of the head 18.

In accordance with the present invention bulb 36 replaces the conventional bulb 24. This new bulb is of the same general configuration as bulb 24 so that it is interchangeable without requiring modification of the flashlight. It has a metallic collar 38 and a center contact 40 which make the same electrical contacts as collar 28 and contact 34 of bulb 24. The base 42 is potted plastic. A light emitting diode (LED) 44 is positioned on the end where it is retained by a plastic grommet 46.

Figure 2:
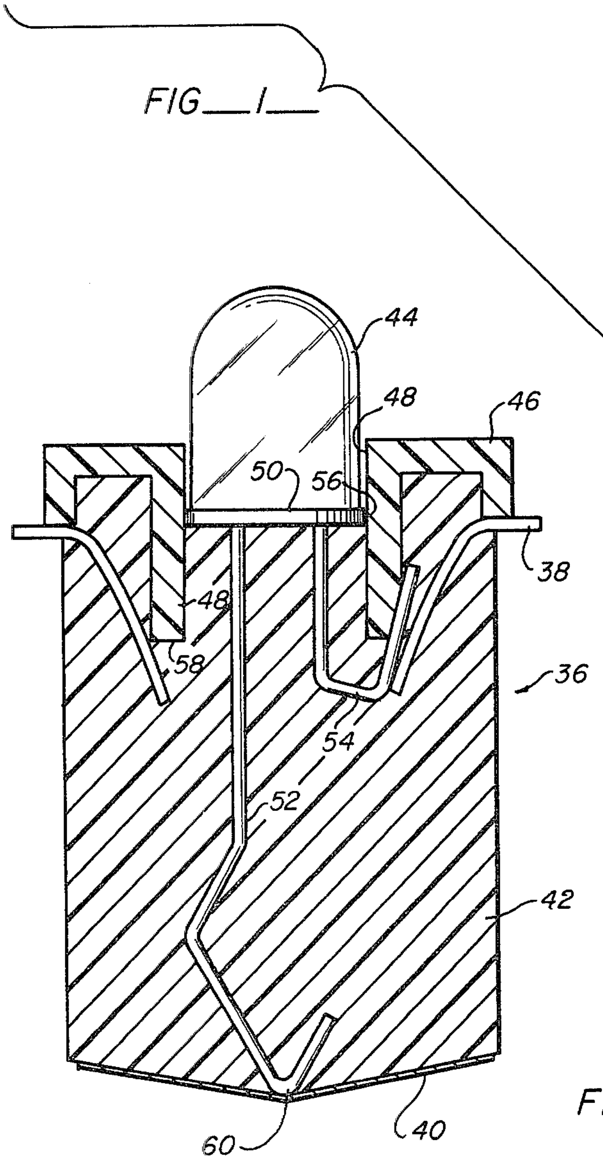
FIG. 2 is a sectional view of a first form of bulb.

A sectional view of the bulb 36 is shown in FIG. 2. Here the LED 44 is positioned within the center opening 48 of plastic grommet 46. This opening has a cylindrical wall against which the LED base 50 sets. This base includes integrated circuitry which will cause the LED to flash at a rate of approximately 3 times per second. Extending downwardly are leads 52, 54. Lead 54 is the cathode or negative lead and is identified as such by a flat edge 56 on base 50 in close proximity to the lead. The LED 44 will not operate if the leads are accidentally reversed.

A brass grommet or collar 38 is positioned over the inner end 58 of cylindrical wall 48 and in electrical contact with cathode lead 54. This grommet flares outwardly and will make contact with reflector 20 of the flashlight shown in FIG. 1, when inserted therein.

The anode or positive lead 52 extends downwardly through the center of the epoxy plastic base 42 and makes electrical contact with an aluminum conductive foil or center contact 40 on the end of the base 42. Wall 48 of plastic grommet 46 keeps this lead 52 spaced from brass grommet 38 until plastic base 42 has been formed.

LED 44 preferably is a commercially available flasher unit known as Flashing Red Light (FRL) 4403 made of Litronix, 19000 Homestead Road, Valico Park, Cupertino, CA 95014 and marketed by Radio Shack, a Division of Tandy Corporation, 1500 One Tandy Center, Fort Worth, TX 76102. The FRL-4403 is a gallium arsenide phosphide solid state lamp with a red diffused plastic lens. The built-in integrated circuit flashes the lamp and can be driven directly by standard digital logic chips having transister-transister logic (TTL) or complimentary metal oxide semiconductor (CMOS) circuits, eliminating the need for external switching circuitry. In the alternative, circuits shown and described in copending application Ser. No. 010,551 filed Feb. 9, 1979 for Blinker Aiming Post Light may be used. The LED 44 maximum supply voltage is 5.25 volts and operates between −55° C. and +55° C. Its peak emission wavelength is 650 mm and its supply current at 5 volts is typically 20 mA. The pulse rate typically is 3 Hz.

In making bulb 36 a preferred method involves the following steps:

1. Insert the LED 44 into the plastic grommet 46.
2. Bend and trim the cathode lead 54 to the approximate size and shape shown.
3. Insert the plastic grommet 46 and LED 44 into the brass grommet 38 with the cathode lead 54 between the two grommets.
4. Bend the anode lead 52 to the shape and length as shown, with the length between the collar of brass grommet 38 and the far bend 60 of anode lead 52 being the same length of the base of a standard flashlight bulb such as a PR6 for example.
5. Place a cylindrical mold around the brass grommet 38 and leads 52, 54, and fill with a non-conductive plastic such as epoxy.
6 When the epoxy has set, remove the mold, trim the end to shape, exposing the anode lead bend 60.
7. Affix a conductive disc such as aluminum foil to the base and assemble into flashlight to obtain diode flashes to ensure electrical integrity.

Figure 3:
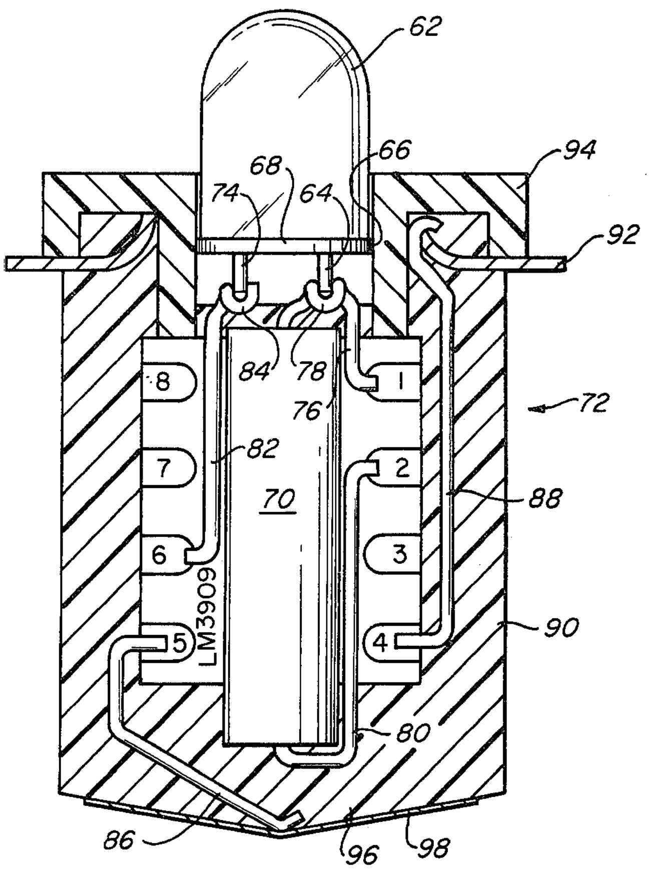
FIG. 3 is a sectional view of a second form of bulb.

Reference is now made to FIG. 3 which shows in section a second embodiment light bulb which uses a Tri-Color LED 62 identified as Radio Shack catalog part no. 276-035. This LED has internal circuitry including a pair of diodes (one red, one green) in series in a push-pull arrangement whereby a current flow in one direction lights the green diode and a current flow in the other direction lights the red diode. An alternating current lights both diodes for a yellow color effect. If lead 64, adjacent flat edge 66 on LED base 68, is connected to the negative side of a battery, a green light is emitted. If it is connected to the positive side of a battery, a red light is emitted. In the absence of additional circuitry such as Radio Shack integrated circuit LM 3909 (catalog part no. 276-1705) and condenser 70 (120 microfarads, 10 volts), the light emission would be steady. With this circuitry, the emission would be flashing. Hence, with flashlight batteries, this bulb may operate in any of four modes, red or green, steady or flashing.

In making bulb 72 in FIG. 3 a preferred method involves the following steps:

1. Trim the leads 64, 74 on LED 62, as shown, to form prongs.
2. Bend condenser lead 76 to form a socket 78 for prong 64 and then attach lead 76 to pin 1 of integrated circuit LM 3909 for fast blinking rate or pin 8 for slower rate.
3. Bend the other condenser lead 80 as shown and attach to pin 2.
4. Bend wire lead 82 to form socket 84 for prong 74 and attach other end to pin 6.
5. Bend wire lead 86 as shown and attach to pin 5.
6. Attach lead 88 to pin 4 and extend upwardly until final assembly.
7. Place assembly in cylindrical mold and fill cavity with epoxy 90.
8. Place brass grommet 92 over top of epoxy with lead 88 extending through grommet opening.
9. Bend lead 88 over brass grommet 92 then insert plastic grommet 94 and LED 62 with prongs 64, 74 into sockets 78, 84. (Rotate the LED to change the light color.)
10. When set, remove from mold, shape base 96 and cap with contact 98 making contact with lead 86.

Figure 4:
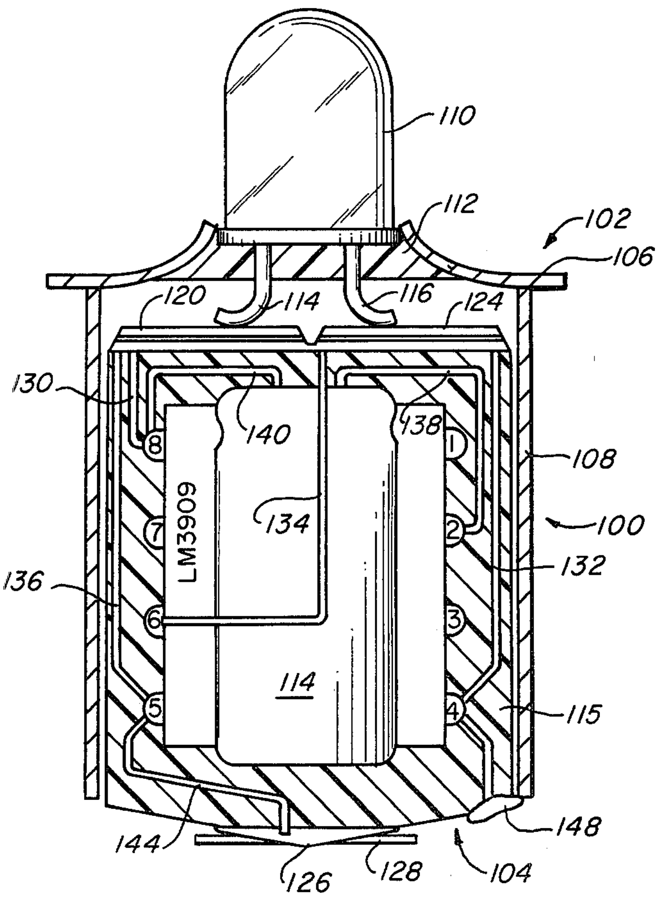
FIG. 4 is a sectional view of a third form of bulb.

A four option LED module 100 is shown in section in FIG. 4. This single module provides for selected use of flashing red, flashing green, steady red or steady green light. Module 100 consists of two major parts, a brass cup 102 and an insert 104. Cup 102 consists of a brass grommet 106 attached to a brass cylinder 108. A Tri-Color LED 110 of the type used in FIG. 3 is bonded by epoxy 112 in the grommet opening. The LED leads 114 and 116 are trimmed and bent, as shown, to make contact with the top of insert 104.

Figure 5:
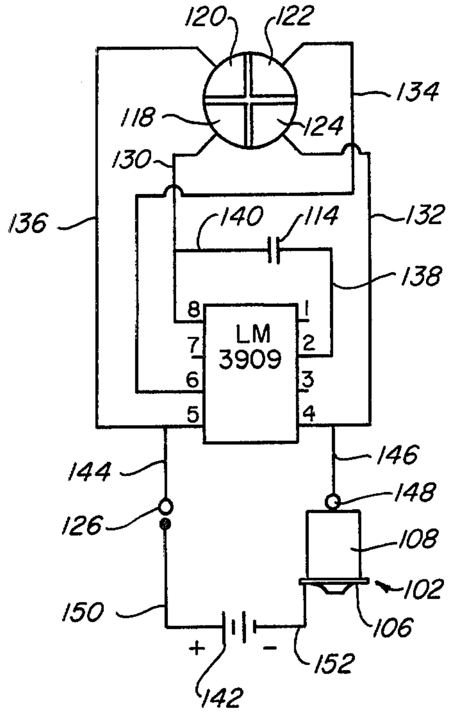
FIG. 5 is a schematic illustration of the circuitry involved with the bulb in FIG. 4.

The insert 104 consists of the integrated circuit LM 3909 of the type used in FIG. 3 and a 100 microfarad 10 volt capacitor 114 embedded in an epoxy material 115. Four conductive segments 118, 120, 122 and 124 are mounted on the top and a positive contact 126 with rotatable handle 128 on the bottom. Various leads interconnect various components as shown in FIG. 5. Here conductive segment 118 is connected by lead 130 to pin 8 of LM 3909 (Connecting it to pin 1 would increase the flash rate.) Segment 124 is connected to pin 4 by lead 132. Segment 122 is connected to pin 6 by lead 134 and segment 120 is connected to pin 5 by lead 136. Capacitor 114 is connected between pins 1 and 8 by leads 138 and 140. Pin 5 connects with the positive side of battery 142 through lead 144 and positive contact 126 at the bottom of the insert 104. Pin 4 connects with the negative side of battery 142 through lead 146 to a solder bead 148 on insert 104 which makes contact with brass cylinder 108 and brass grommet 106 of brass cup 102. Battery leads 150, 152 are internal connectors of the flashlight housing the battery 142 and the bulb module 100.

The entire insert assembly 104 is potted in epoxy is a form slightly smaller than the interior of the brass cup 102. With handle 128 it can be rotated so that the LED operates in the desired mode, with a red or green blinking or steady light.

Figure 6:
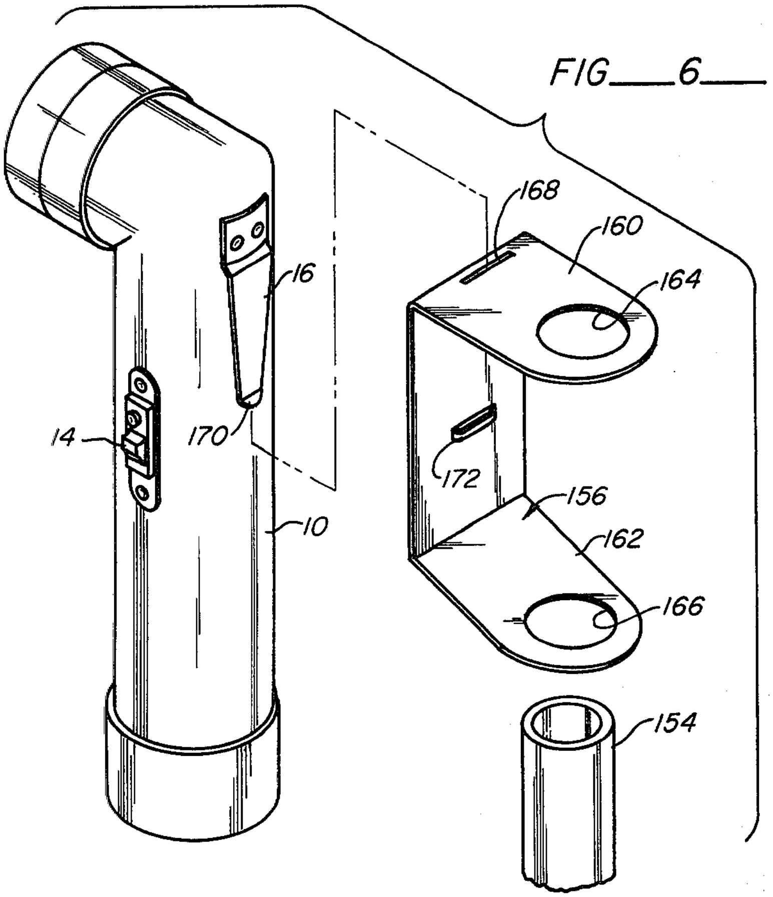
FIG. 6 is an exploded view in perspective of the flashlight mounted on an aiming post.

FIG. 6 is an exploded view in perspective of the flashlight mounted on an aiming post. As pointed out in describing the flashlight 10 in FIG. 1, the flashlight itself is unmodified. If no bulbs of the type described are available, an ordinary flashlight bulb, such as a PR6 bulb for example, may be used. The aiming post 154 is driven into the ground. Preferably, it is an ordinary tubular length of pipe. A spring steel bracket 156 is adapted for mounting on post 154 with flashlight 10 attached to the bracket 156 by means of the flashlight belt clip 16.

Bracket 156 is a flat thin strip of spring steel bent into a C-configuration with a vertical center portion 158, a horizontal upper portion 160 and a downwardly and rearwardly lower portion 162 sloping on the order of 110°. Upper portion 160 and lower portion 162 have openings 164, 166 for insertion over post 154, when the lower portion 162 is pressed to horizontal position. After insertion, the spring action of the bracket 156 tends to restore lower portion 162 to its 110° incline, frictionally clamping the bracket 156 to the post 154.

Upper bracket portion 160 had a slot 168 along its forward edge, into which the free end 170 of belt clip 16 may be inserted. The vertical center portion 158 has a transverse holding strip 172, depressed outwardly from its vertical plane, to receive the free end 170 of the belt clip 16 between the strip 172 and the central portion 158 of the bracket.

The invention in its broader aspects is not limited to the specific combinations, improvements and instrumentalities described but departures may be made therefrom within the scope of the accompanying claims without departing from the principles of the invention and without sacrificing its chief advantages.

I claim:

1. An aiming post light comprising a post, a flashlight having a bulb and batteries therein, and a bracket, said flashlight having a belt clip thereon, said flashlight projecting a beam of light at an angle of 90° to the axis of said batteries therein, said bracket removeably connecting said flashlight belt clip with said post and positioning said flashlight thereon for emission of light in a substantially horizontal beam therefrom.

2. An aiming post light as set forth in claim 1 wherein said bulb comprises an LED and epoxy base of size and configuration substantially similar to that of a conventional flashlight bulb base, said epoxy base including a metallic collar at one end and a center contact on another end, said LED being mounted on said base at said one end and having a lead connected to said collar, said LED having another lead connected to said center contact on said another end.

3. An aiming post light as set forth in claim 1 wherein said bracket includes a vertical center portion, a horizontal upper portion and a downwardly and rearwardly lower portion, openings in said upper and lower portions for insertion over said post when said lower portion is pressed to horizontal position, and mounting means on said bracket for receiving said belt clip of said flashlight whereby said flashlight is maintained vertically on said post.

4. An aiming post light as set forth in claim 3, said mounting means comprising a transverse slot in said upper portion along the forward edge thereof, and a transverse holding strip on said vertical central portion, said strip being spaced from the vertical plane of said vertical central portion to receive said belt clip therebetween.

5. An aiming post light as set forth in claim 2 wherein said LED leads are connected to said collar and said center contact through connections on an integrated circuit.

* * * * *